(12) United States Patent
Yamada et al.

(10) Patent No.: US 10,288,138 B2
(45) Date of Patent: May 14, 2019

(54) FRICTION MATERIAL FOR CLUTCH

(71) Applicants: EXEDY Corporation, Neyagawa-shi, Osaka (JP); EXEDY Friction Material Co., Ltd., Chonburi (TH); NISSAN MOTOR CO., LTD., Yokohama-shi, Kanagawa (JP)

(72) Inventors: Takeshi Yamada, Neyagawa (JP); Nobuyasu Watanabe, Neyagawa (JP); Hiroki Mori, Neyagawa (JP); Takashi Takehara, Chonburi (TH); Shinya Unigame, Chonburi (TH); Kazushige Yoshida, Atsugi (JP); Go Yanagisawa, Atsugi (JP); Masashi Hatano, Atsugi (JP); Tatsuya Osone, Atsugi (JP)

(73) Assignee: EXEDY CORPORATION, Neyagawa-Shi, Osaka (JP)

( * ) Notice: Subject to any disclaimer, the term of this patent is extended or adjusted under 35 U.S.C. 154(b) by 0 days.

(21) Appl. No.: 14/916,118

(22) PCT Filed: Sep. 5, 2014

(86) PCT No.: PCT/JP2014/073437
§ 371 (c)(1),
(2) Date: Mar. 2, 2016

(87) PCT Pub. No.: WO2015/034033
PCT Pub. Date: Mar. 12, 2015

(65) Prior Publication Data
US 2016/0195150 A1    Jul. 7, 2016

(30) Foreign Application Priority Data

Sep. 9, 2013 (JP) .................... 2013-186787

(51) Int. Cl.
F16D 13/64 (2006.01)
F16D 69/04 (2006.01)
(Continued)

(52) U.S. Cl.
CPC ......... *F16D 69/023* (2013.01); *F16D 13/648* (2013.01); *F16D 69/00* (2013.01);
(Continued)

(58) Field of Classification Search
CPC ...... F16D 69/023; F16D 69/025; F16D 69/00; F16D 13/648; F16D 2069/004; F16D 2069/005; F16D 2069/008
See application file for complete search history.

(56) References Cited

U.S. PATENT DOCUMENTS 3,231,058 A * 1/1966 Batchelor ............. F16D 13/648
188/218 XL
4,119,591 A 10/1978 Aldrich
(Continued)

FOREIGN PATENT DOCUMENTS

CN 101427047 A 5/2009
CN 103026091 A 4/2013
(Continued)

OTHER PUBLICATIONS

Decision to Grant a Patent dated Mar. 21, 2017 for Japanese Patent Application No. 2013-186788 (English Translation), 3 pp.
(Continued)

*Primary Examiner* — Jacob S. Scott
*Assistant Examiner* — Lillian T Nguyen
(74) *Attorney, Agent, or Firm* — United IP Counselors, LLC

(57) ABSTRACT

A clutch friction material includes a base material containing a rubber material and a thermosetting resin. The clutch friction material also includes an intermediate layer disposed
(Continued)

on the base material. The intermediate layer includes either a glassy carbon structure or a graphite structure formed as a result of thermal curing of the thermosetting resin contained in the base material. In addition, the clutch friction material includes an outermost surface layer disposed on the intermediate layer. The outermost surface layer contains a pyrolysate produced as a result of pyrolysis of rubber and resin components contained in the base material.

8 Claims, 4 Drawing Sheets

(51) Int. Cl.
F16D 69/02 (2006.01)
F16D 69/00 (2006.01)

(52) U.S. Cl.
CPC ......... F16D 69/025 (2013.01); F16D 69/026 (2013.01); F16D 2069/004 (2013.01); F16D 2069/005 (2013.01); F16D 2069/008 (2013.01); F16D 2200/0078 (2013.01); F16D 2200/0086 (2013.01); F16D 2250/0038 (2013.01)

(56) References Cited

U.S. PATENT DOCUMENTS

| | | | | |
|---|---|---|---|---|
| 4,291,794 | A * | 9/1981 | Bauer | F16D 69/023 192/107 M |
| 5,004,089 | A * | 4/1991 | Hara | B29C 43/021 192/107 M |
| 5,305,864 | A * | 4/1994 | Strohm | F16D 13/64 192/107 C |
| 6,316,083 | B1 | 11/2001 | Kawabata et al. | |
| 6,666,310 | B1 * | 12/2003 | Berreth | B32B 18/00 188/218 XL |
| 2002/0153213 | A1 * | 10/2002 | Gruber | C04B 35/573 188/218 XL |
| 2009/0053502 | A1 | 2/2009 | Spandern | |
| 2010/0096238 | A1 | 4/2010 | Gerbing et al. | |
| 2013/0037373 | A1 | 2/2013 | Dong et al. | |
| 2013/0284548 | A1 * | 10/2013 | Guether | B32B 18/00 188/218 XL |
| 2013/0334006 | A1 * | 12/2013 | Stern | F16C 17/04 192/107 M |

FOREIGN PATENT DOCUMENTS

| | | |
|---|---|---|
| EP | 1251290 A2 | 10/2002 |
| EP | 1750031 A2 | 2/2007 |
| EP | 2013510 A2 | 1/2009 |
| JP | S62-106135 A | 5/1987 |
| JP | H03255234 A | 11/1991 |
| JP | H03255235 A | 11/1991 |
| JP | H05247233 A | 9/1993 |
| JP | H07224872 A | 8/1995 |
| JP | 2000037797 A | 2/2000 |
| JP | 2000256652 A | 9/2000 |
| JP | 2002129143 A | 5/2002 |
| JP | 2004144301 A | 5/2004 |
| JP | 3556071 B2 | 8/2004 |
| JP | 2007-045860 A | 2/2007 |
| JP | 2009534590 A | 9/2009 |
| JP | 2013044357 A | 3/2013 |
| JP | 2013119899 A | 6/2013 |
| JP | 2015052385 A | 3/2015 |
| KR | 1020080110841 A | 12/2008 |
| SU | 1612562 A1 | 7/1996 |
| WO | 2007121704 A2 | 11/2007 |
| WO | 2013022823 A2 | 2/2013 |

OTHER PUBLICATIONS

Notification of Reasons for Refusal dated Nov. 16, 2016 for Japanese Patent Application No. 2013-186788 (English Translation), 3 pp.
Office Action dated May 4, 2017 for Chinese Patent Application No. 201480045483.5, 7 pp.
Extended European Search Report dated Feb. 24, 2017 from European Patent Office for corresponding European patent Application No. 14842507.7.
International Search Report for Int'l App. No. PCT/JP2014/073437, Nov. 18, 2014, 1-2.
Decision to Grant of the corresponding Russian Patent Application No. 2016113287/11 (020800) dated Apr. 19, 2018.
Decision to Grant issued in Japanese Patent Application No. 2015-535525 dated Jan. 15, 2019, 3pp.

* cited by examiner

FRICTION MATERIAL FOR CLUTCH

CROSS-REFERENCES TO RELATED APPLICATIONS

This application is the U.S. National Phase of PCT International Application No. PCT/JP2014/073437, filed on Sep. 5, 2014. That application claims priority to Japanese Patent Application No. 2013-186787, filed Sep. 9, 2013. The contents of both applications are herein incorporated by reference in their entirety.

BACKGROUND

Technical Field

The present invention relates to a friction material, particularly to a clutch friction material to be used for an automobile clutch or an industrial machine clutch configured to allow and prevent transmission of power.

Background Art

A variety of clutches have been used in the field of well-known power transmission systems, particularly in the field of automobile power transmission systems. Recently, even in hybrid electric vehicles (HEVs) using the combination of a gasoline engine and an electric motor, a clutch is mounted between a gearbox input shaft and either an electric motor output shaft or an engine output shaft. This type of clutch is configured to switch a drive mode between a motor drive mode and an engine drive mode. Additionally, the clutch herein used is a wet-type multi-plate clutch capable of stably transmitting power.

In the wet-type multi-plate clutch as described above, oil intervenes between constituent elements of a power transmission path. Therefore, there is a drawback that degradation in efficiency is caused in regeneration, i.e., in using the motor as a power generator for braking. On the other hand, intervention of oil can stabilize power transmission performance and prolong product life, but may have negative effect on environment. Therefore, it has been considered to use, even in the HEVs, a dry-type multi-plate clutch without intervention of oil in the power transmission path.

In well-known dry-type multi-plate clutches, a friction plate has a large friction coefficient. Therefore, chances are that when a dry-type multi-plate clutch is used in an HEV, an excessive torque is abruptly transmitted in an early stage of clutch engagement in switching from the motor drive mode to the engine drive mode. Also, chances are that a torque cannot be stably transmitted. Because of this, chances are that vehicle body vibrations (juddering) attributed to a drivetrain and/or clutch squeaking (noises) occur. These vehicle body vibrations and/or noises are transferred to a driver and a passenger and possibly make them feel uncomfortable. Especially, unlike engine drive vehicles, the HEVs quietly start moving due to the electric motor. Hence, the driver and passenger are more likely to feel the vibrations and/or noises as described above.

It has been known that these vibrations and/or noises are likely to occur when a clutch system is in a relatively unused condition or in a fatigue condition.

Now, Japan Laid-open Patent Application Publication No. 2013-119899 describes that a dry-type multi-plate clutch is used in a driving force transmission device of an HEV. In the construction of Japan Laid-open Patent Application Publication No. 2013-119899, a front cover, accommodating the driving force transmission device, includes outward discharge ports for releasing wear powder produced from the dry-type clutch to the outside. Additionally, water is prevented from intruding into a sealed space through the outwardly discharging ports.

Japan Laid-open Patent Application Publication No. 2013-44357 discloses that a dry-type friction material containing compounded rubber includes holes/grooves formed in/on its surface opposite to its friction surface so as to discharge reactant gas of the compound rubber.

Japan Laid-open Patent Application Publication No. 2004-144301 discloses a friction material with improved wear performance.

Japan Laid-open Patent Application Publication No. 2000-256652 discloses a dry-type friction material that exerts better wear resistance under the conditions of high-speed rotation and high temperature and can maintain a high friction coefficient.

Japan Laid-open Patent Application Publication No. 2000-37797 discloses a method of manufacturing a friction material blank that does not degrade in burst strength, wear rate and swaging hole workability.

SUMMARY

As described in Japan Laid-open Patent Application Publication Nos. 2013-44357, 2004-144301, 2000-256652, and 2000-37797, a large number of inventions have been proposed regarding the dry-type friction materials and the wet-type friction materials. However, in any of the inventions, it is intended to enhance the durability and the friction coefficient of a friction material.

Now, vehicle body vibrations and/or noises as described above are attributed to friction vibrations occurring on a friction boundary between the friction material and its opponent member.

In view of the above, inventors of the present invention made a keen study of a clutch friction material to solve the drawbacks of the vibrations and/or noises as described above, and made a friction material that can solve the drawbacks of the well-known clutch friction materials, particularly an invention that is effective for solving the drawbacks in an early stage of usage of the friction materials.

It is an object of the present invention to provide a clutch friction material that is unlikely to cause friction vibrations occurring on a friction boundary and in which stable friction characteristics can be obtained early even immediately after beginning of usage.

Solution to Problems

A clutch friction material according to an aspect of the present invention includes a base material, an intermediate layer and an outermost surface layer. The base material contains a rubber material and a thermosetting resin. The intermediate layer is disposed on the base material, and includes a glassy carbon structure or a graphite structure formed as a result of thermal curing of the thermosetting resin contained in the base material. The outermost surface layer is disposed on the intermediate layer, and contains a pyrolysate produced as a result of pylorysis of rubber and resin components contained in the base material.

Preferably, the base material further contains a vulcanizing agent.

Preferably, the base material further contains a reinforced fiber and a friction coefficient modifier.

Preferably, the intermediate layer has a thickness in a range of greater than or equal to 1 μm and less than or equal to 3 μm.

Preferably, the outermost surface layer has a thickness in a range of greater than or equal to 10 μm and less than or equal to 15 μm.

Preferably, the intermediate layer and the outermost surface layer are formed as a result of heating treatment of the base material at a temperature in a range of greater than or equal to 250 degrees Celsius and less than or equal to 295 degrees Celsius for a period of time in a range of greater than or equal to 2 hours and less than or equal to 10 hours.

Preferably, the clutch friction material further includes a plurality of grooves formed on one of surfaces thereof.

Preferably, the base material has a ring shape with a center axis. Further, the plurality of grooves are formed while radially extending about the center axis.

Preferably, the plurality of grooves are circumferentially disposed at equal angular intervals.

The clutch friction material according to the present invention includes the layer in which rubber and resin are heat-denatured, and even in the beginning of its usage, this layer has stable friction characteristics similar to those of a friction material with long usage. Therefore, the clutch friction material is unlikely to cause friction vibrations, and it is possible to reduce occurrence of noises and juddering of a clutch as resultants of the friction vibrations.

DETAILED DESCRIPTION OF EMBODIMENTS

Figure 1:
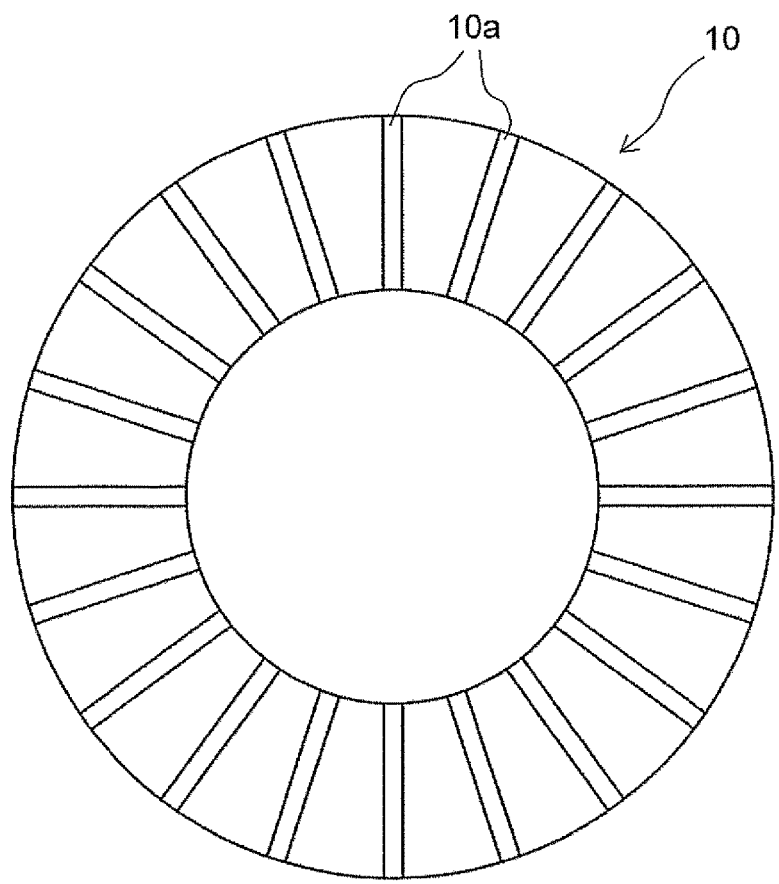
FIG. 1 is a front view of a clutch friction material according to an exemplary embodiment of the present invention.

An exemplary embodiment of the present invention will be hereinafter explained with reference to attached drawings. This exemplary embodiment is only intended to explain the present invention, and the present invention is not limited to the exemplary embodiment that is illustrated in the drawings and is described in the following detailed explanation.

Figure 2:
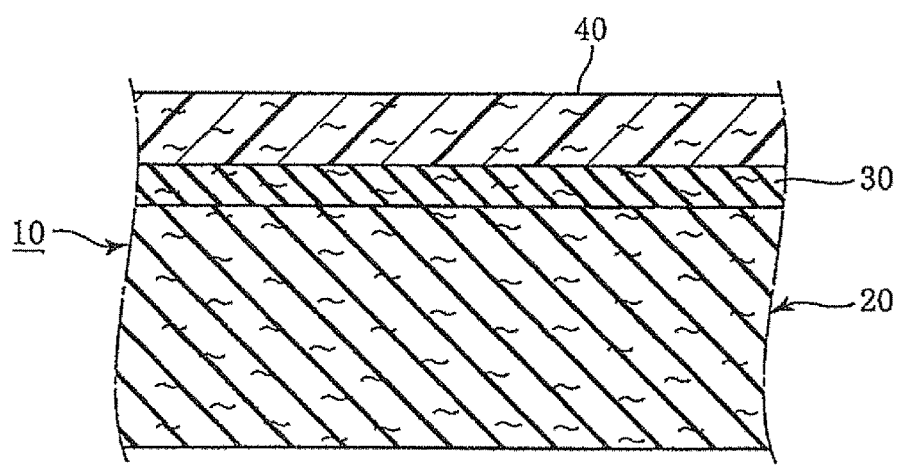
FIG. 2 is a schematic cross-sectional view of the friction material shown in FIG. 1.

FIG. 1 is a front view of a friction material 10 according to the exemplary embodiment of the present invention, whereas FIG. 2 is a cross-sectional view of the friction material 10. The friction material 10 has a ring shape and includes a plurality of grooves 10a on the both surfaces thereof. The plural grooves 10a radially extend about a center axis and are circumferentially aligned at equal angular intervals.

The friction material 10 includes a base material 20 as a base for the friction material, an intermediate layer 30 disposed on the base material 20, and an outermost surface layer 40 disposed on the intermediate layer 30.

The base material 20 contains, as a principal component, a rubber material containing a single or a combination of acrylonitrile-butadiene rubber (NBR) and styrene-butadiene rubber (SBR). The base material 20 further contains additives such as a reinforced fiber, a thermosetting resin, a friction coefficient modifier and a vulcanizing agent.

A single or a combination of two or more of the group consisting of natural pulp, synthetic fiber, high-performance fiber (e.g., aramid fiber, carbon fiber, etc.), glass fiber, metallic fiber and so forth can be used as the reinforced fiber. The states of these fibers may be a single or a combination of the group consisting of a chopped state, a yarn state, a ribbon state and a non-woven fabric state. When these fibers are in the chopped state, it is preferable that these fibers are homogeneously distributed with respect to the rubber material and the additives.

A single or a combination of two or more of the group consisting of phenol resin, epoxy resin, melamine resin and phthalate resin can be used as the thermosetting resin.

A single or a combination of the group consisting of carbon particles (e.g., carbon black, graphite, etc.), inorganic material powder (e.g., activated carbon, diatomaceous earth, talc, etc.) and organic material powder (e.g., cashew nut powder) can be used as the friction coefficient modifier.

The base material 20 further contains a vulcanizing component for curing a rubber component.

Figure 3:
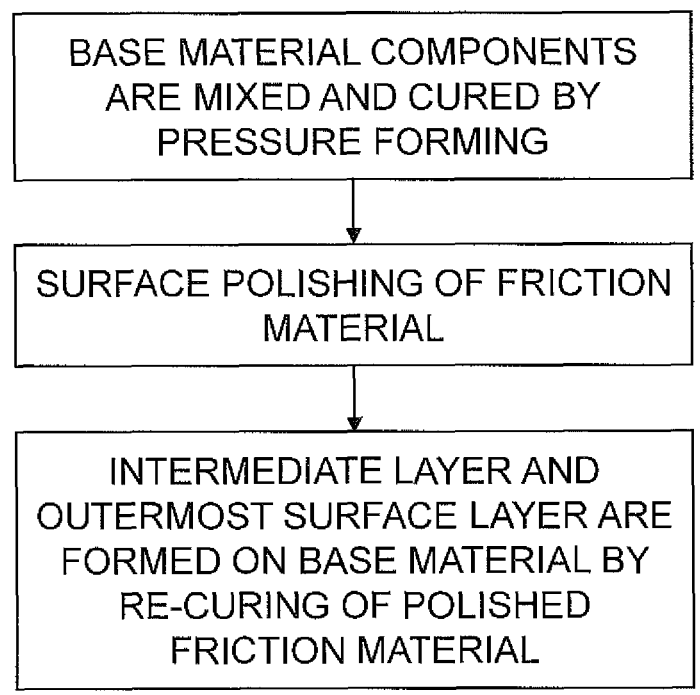
FIG. 3 is a flowchart showing an exemplary method of manufacturing the friction material shown in FIG. 1.

As shown in a flowchart of FIG. 3, the friction material according to the exemplary embodiment of the present invention is manufactured by the following method.

First, acrylonitrile-butadiene rubber (NBR), phenol resin, fiber and friction modifier are mixed and are then cured by pressure-forming, whereby the base material 20 having a ring shape is manufactured. It should be noted that at this time, the plural grooves 10a are simultaneously formed. At least one surface of the base material 20 is polished, whereby the friction material 10 having a ring shape is manufactured.

The friction material 10 thus manufactured is loaded into a furnace while being interposed and held between two metallic plates. In-furnace temperature is herein heated up to 280 degrees Celsius in two hours and this temperature is kept for four hours. When the in-furnace temperature then becomes 150 degrees Celsius, the friction material 10 is taken out of the furnace.

The friction material 10 obtained as described above was cut, and components in its cross section were analyzed. Consequently, it was found that two layers containing different components were formed on the base material 20 of the friction material 10. Specifically, it was found that the outermost surface layer 40 located outermost and the intermediate layer 30 located between the outermost surface layer 40 and the base material 20 were formed.

The outermost surface layer 40 had a thickness of about 10 μm. As a result of component analysis using TG-DTA (analysis of thermal behaviors was conducted by TG-DTA, whereas analysis of components was conducted by another method such as gas mass spectrometry), it was found that in the outermost surface layer 40, pyrolysis was caused in a part of the rubber component originally contained in the base material whereas pyrolysis and thermal curing were caused in a part of the thermosetting resin.

On the other hand, the intermediate layer 30 located between the outermost surface layer 40 and the base material 20 had a thickness of about 2 μm. As a result of component analysis, it was found that a glassy carbon structure or a graphite structure was formed by thermal curing of the thermosetting resin component originally contained in the base material.

Figure 4:
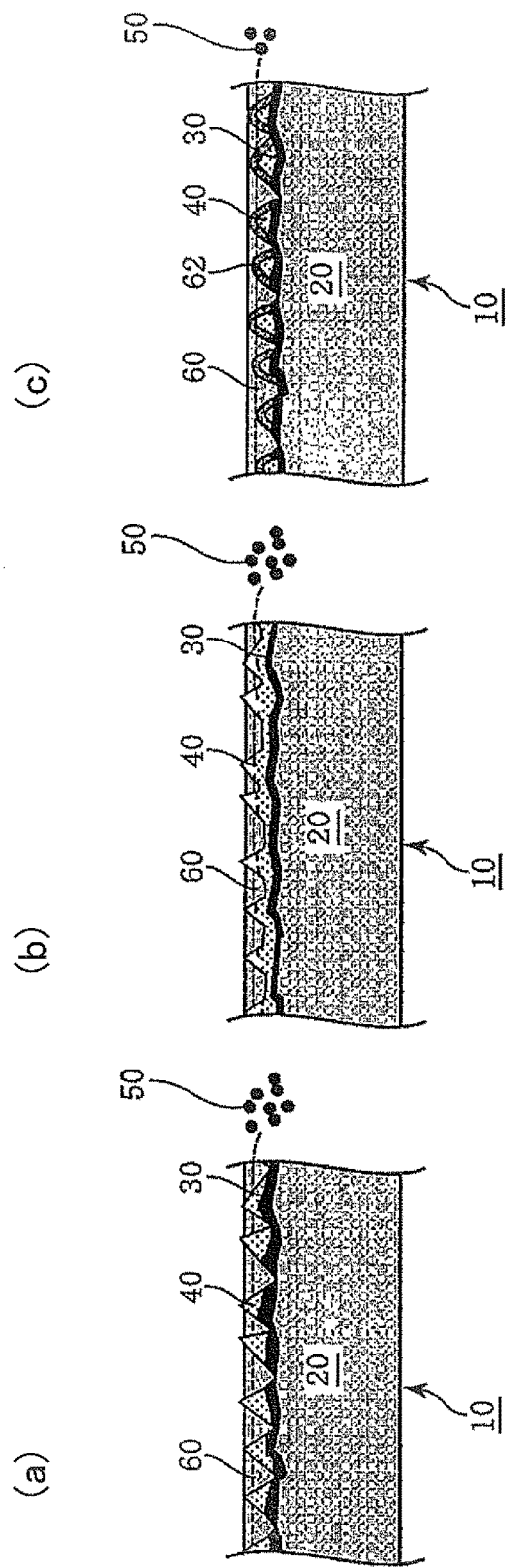
FIG. 4 is a diagram showing variation in relation between the friction material and a driven plate according to the exemplary embodiment of the present invention.

In addition to the structure and the component analysis as described above, FIG. 4 shows a result of a test conducted for checking friction and vibration of the friction material processed with the aforementioned thermal treatment (re-curing). As shown in FIG. 4, the following was found. In an initial phase (a), a driven plate 60 scraped the outermost surface layer 40 of the friction material 10, and thereby wear powder 50 was discharged. Under the condition, the initial phase transitioned to a transitional phase. In this transitional phase (b), protrusions of the driven plate 60 were worn, and the wear powder 50 was discharged. When the transitional phase transitioned to a stable phase (c), a stable film 62 was formed on the driven plate 60, and the friction material 10 was mainly worn.

Moreover, tests were conducted for checking friction and vibration of both a friction material processed with heating treatment under different conditions using a base material having the same composition as the aforementioned base material and a friction material not processed with thermal treatment (conventional product). As a result, it was confirmed that a similar effect could be achieved at a heating temperature in a range of 250-295 degrees Celsius for a heating time in a range of 2-10 hours. It should be noted that when the treatment was conducted at a heating temperature in a range of 250-295 degrees Celsius for a heating time in a range of 2-10 hours, the intermediate layer was formed with a thickness in a range of greater than or equal to 1 μm and less than or equal to 3 μm, whereas the outermost layer was formed with a thickness in a range of greater than or equal to 10 μm and less than or equal to 15 μm.

Furthermore, a dry-type multi-plate clutch, including a plurality of friction plates and a plurality of driven plates, was manufactured. Here, each friction plate has a construction that the friction material/materials of the present invention, processed with heating treatment as described above, is/are adhered to either/both of the surfaces of a cored bar. The driven plates were disposed in opposition to the friction plates through gaps. The dry-type multi-plate clutch was installed in a hybrid automobile, and a driving test was conducted under the condition. As a result, it was found that a torque transmitted from a clutch was quite stable and juddering and noises such as squeaking were not caused in the product processed with heating treatment in comparison with the product not processed with heating treatment.

Additionally, the plural grooves 10a are formed on the surface of the friction material 10. Hence, wear powder can be effectively discharged from the friction surface to the outer periphery, and furthermore, drag is alleviated.

Other Exemplary Embodiments (a) The friction material according to the aforementioned exemplary embodiment has been described as being used for a dry-type clutch. However, the application of the friction material is not limited to the dry-type clutch. The friction material is also effectively applied to a wet-type clutch.

(b) The friction material of the present invention is not limited to a friction material for a dry-type multi-plate clutch to be used in a hybrid automobile, and can be similarly used in an engine drive vehicle and an electric motor drive vehicle.

(c) In the aforementioned exemplary embodiment, the friction material has a ring shape. However, the shape of the friction material is not limited to this. For example, the friction material may have an annular sector shape, or alternatively, may have a rectangular shape or so forth. When the friction material has an annular sector shape, a clutch friction material similar to that of the aforementioned exemplary embodiment can be obtained by disposing a plurality of the friction materials in circular alignment.

(d) In the present invention, grooves are not necessarily formed on the friction material. Additionally, the shape and arrangement of the grooves are also not limited to those of the aforementioned exemplary embodiment.

INDUSTRIAL APPLICABILITY

In this clutch friction material, even in the beginning of its usage, the layer in which rubber and resin layers are heat-denatured has stable friction characteristics similar to those of a friction material with long usage. Therefore, the clutch friction material is unlikely to cause friction vibrations, and it is possible to reduce occurrence of noises and juddering of a clutch as resultants of the friction vibrations.

REFERENCE SIGNS LIST

10 Friction material
10A Groove
20 Base material
30 Intermediate layer
40 Outermost surface layer
50 Wear powder
60 Driven plate
62 Stable film

The invention claimed is:

1. A method of producing a clutch friction material, the method comprising:
    preparing a base material containing a rubber material and a thermosetting resin, wherein the base material has a ring shape with a center axis, and a plurality of grooves radially extend about the center axis;
    polishing at least one surface of the base material; and
    performing a thermal treatment for the polished at least one surface of the base material (i) to form an intermediate layer disposed on the base material, the intermediate layer including either a glassy carbon structure or a graphite structure formed as a result of thermal curing of the thermosetting resin contained in the base material, and (ii) to form an outermost surface layer disposed on the intermediate layer, the outermost surface layer containing a pyrolysate produced as a result of pyrolysis of the rubber material and the thermosetting resin contained in the base material, wherein the plurality of grooves are formed on a surface of the clutch friction material.

2. The method recited in claim 1, wherein the base material further contains a vulcanizing agent.

3. The method recited in claim 2, wherein the base material further contains a reinforced fiber and a friction coefficient modifier.

4. The method recited in claim 1, wherein the intermediate layer has a thickness in a range of greater than or equal to 1 μm and less than or equal to 3 μm.

5. The method recited in claim 1, wherein the outermost surface layer has a thickness in a range of greater than or equal to 10 μm and less than or equal to 15 μm.

6. The method recited in claim 1, wherein the intermediate layer and the outermost surface layer are formed as a result of heating treatment of the base material at a temperature in a range of greater than or equal to 250 degrees Celsius and less than or equal to 295 degrees Celsius for a period of time in a range of greater than or equal to 2 hours and less than or equal to 10 hours.

7. The method recited in claim 1, wherein the plurality of grooves are circumferentially disposed at equal angular intervals.

8. The method recited in claim 1, wherein the thermal curing and the pyrolysis are performed after the at least one surface of the base material is polished.

\* \* \* \* \*

UNITED STATES PATENT AND TRADEMARK OFFICE
CERTIFICATE OF CORRECTION

PATENT NO. : 10,288,138 B2  
APPLICATION NO. : 14/916118  
DATED : May 14, 2019  
INVENTOR(S) : Yamada et al.

Page 1 of 1

It is certified that error appears in the above-identified patent and that said Letters Patent is hereby corrected as shown below:

On the Title Page

Item (73) Assignee: EXEDY CORPORATION, Neyagawa-Shi, Osaka (JP), should read --- (73) Assignee: EXEDY CORPORATION, Neyagawa-shi, Osaka (JP); EXEDY FRICTION MATERIAL CO., LTD., Chonburi (TH); NISSAN MOTOR CO., LTD., Yokohama-shi, Kanagawa (JP) ---

Signed and Sealed this  
Eleventh Day of February, 2020

Andrei Iancu  
*Director of the United States Patent and Trademark Office*